United States Patent [19]

Waehner

[11] Patent Number: 5,220,254
[45] Date of Patent: Jun. 15, 1993

[54] ANTI-ROLL TELEVISION VERTICAL DEFLECTION SYSTEM

[75] Inventor: Glenn C. Waehner, New Canaan, Conn.

[73] Assignee: American Dynamics Corporation, Orangeburg, N.Y.

[21] Appl. No.: 927,882

[22] Filed: Aug. 10, 1992

Related U.S. Application Data

[63] Continuation of Ser. No. 550,151, Jul. 9, 1990, abandoned.

[51] Int. Cl.⁵ .................. H01J 29/70; H01J 29/76
[52] U.S. Cl. ........................ 315/403; 358/148
[58] Field of Search ............ 315/403, 408; 358/154, 358/159, 148

[56] References Cited

U.S. PATENT DOCUMENTS

| | | | |
|---|---|---|---|
| 3,553,473 | 1/1971 | Steinbacher | 307/108 |
| 3,681,712 | 8/1972 | Waybright | 331/145 |
| 4,387,396 | 6/1983 | Tanaka et al. | 358/154 |
| 4,803,552 | 2/1989 | Marin | 358/148 |
| 4,992,707 | 2/1991 | Arai et al. | 315/403 |

FOREIGN PATENT DOCUMENTS 1537964 5/1970 Fed. Rep. of Germany .
2592261 12/1985 France .

OTHER PUBLICATIONS

"Synch Lock for Vertical Deflection IC", IBM Technical Disclosure Bulletin, vol. 30, No. 4, Sep. 1987, pp. 1606–1607.

Primary Examiner—Theodore M. Blum
Attorney, Agent, or Firm—Peter L. Michaelson; Raymond R. Moser, Jr.

[57] ABSTRACT

Vertical deflection circuitry for substantially eliminating rolling and bouncing in a video monitor, where, for example, the video monitor successively displays images produced by each of one of a plurality of non-synchronized video cameras and an incoming vertical synchronization (synch) signal to the monitor is merely a composite of the individual vertical synch signals generated by each of these cameras. Specifically, the vertical deflection circuitry generates the appropriate vertical sweep signal for a current one of these cameras from this composite synch signal so as to properly locate the corresponding video image generated by this camera on a display screen of the monitor. Inasmuch as the vertical deflection circuitry is re-triggerable, then, whenever an out-of-lock condition occurs between a camera and a monitor, this circuitry can establish a vertical lock condition on the next incoming vertical synch pulse in the composite synch signal rather than requiring numerous vertical frames to occur before vertical synchronization is achieved between that camera and monitor.

18 Claims, 11 Drawing Sheets

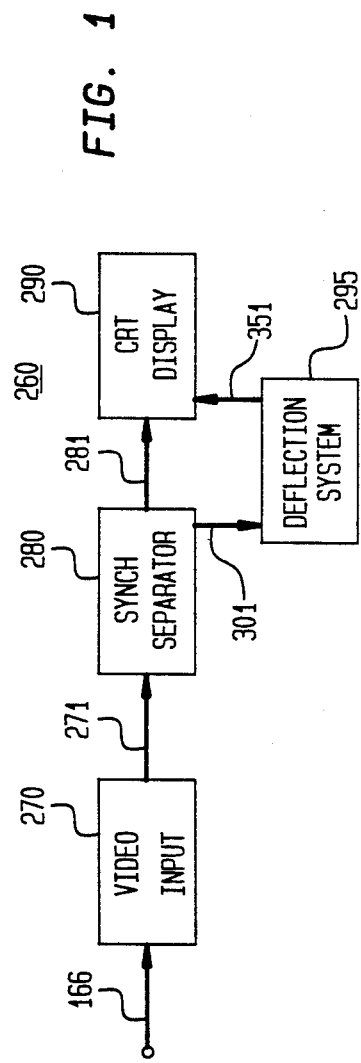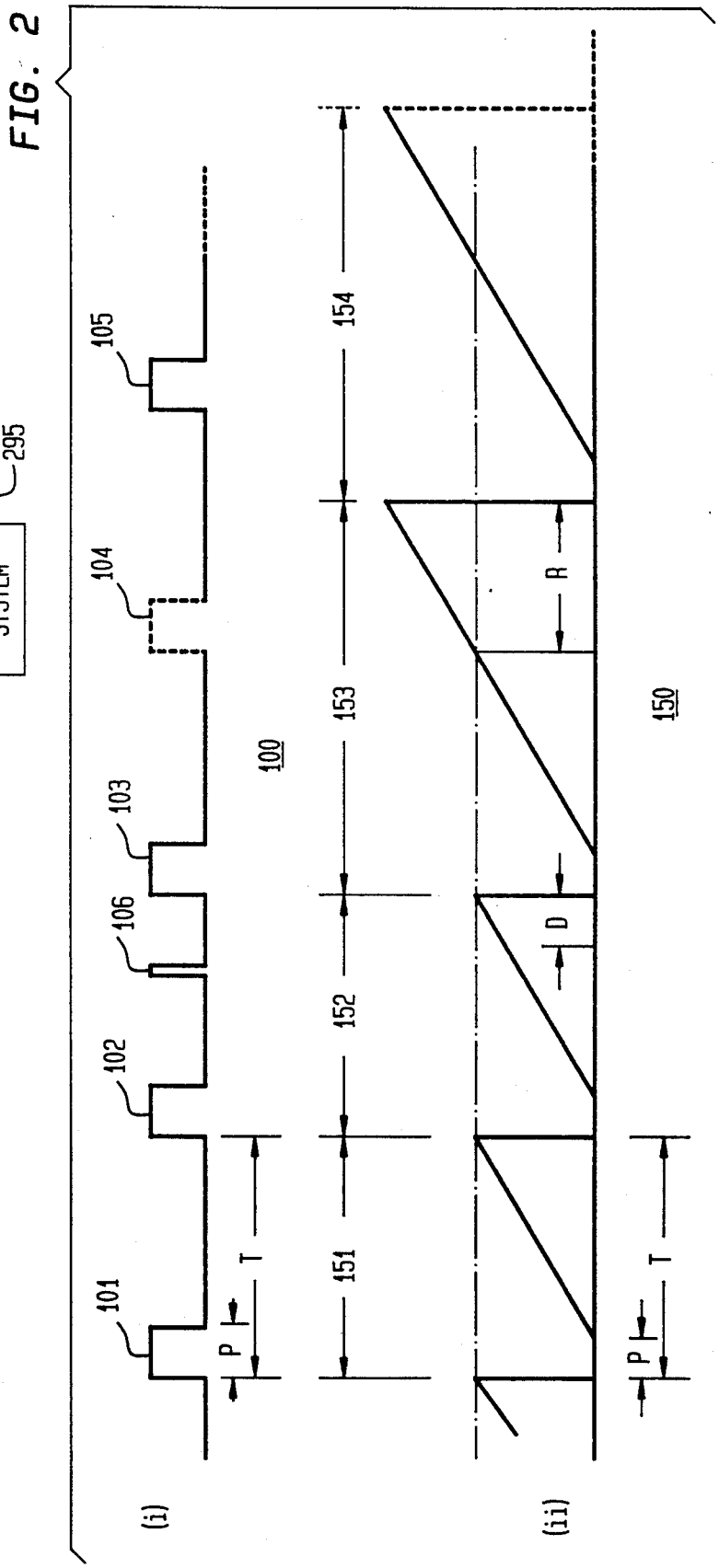

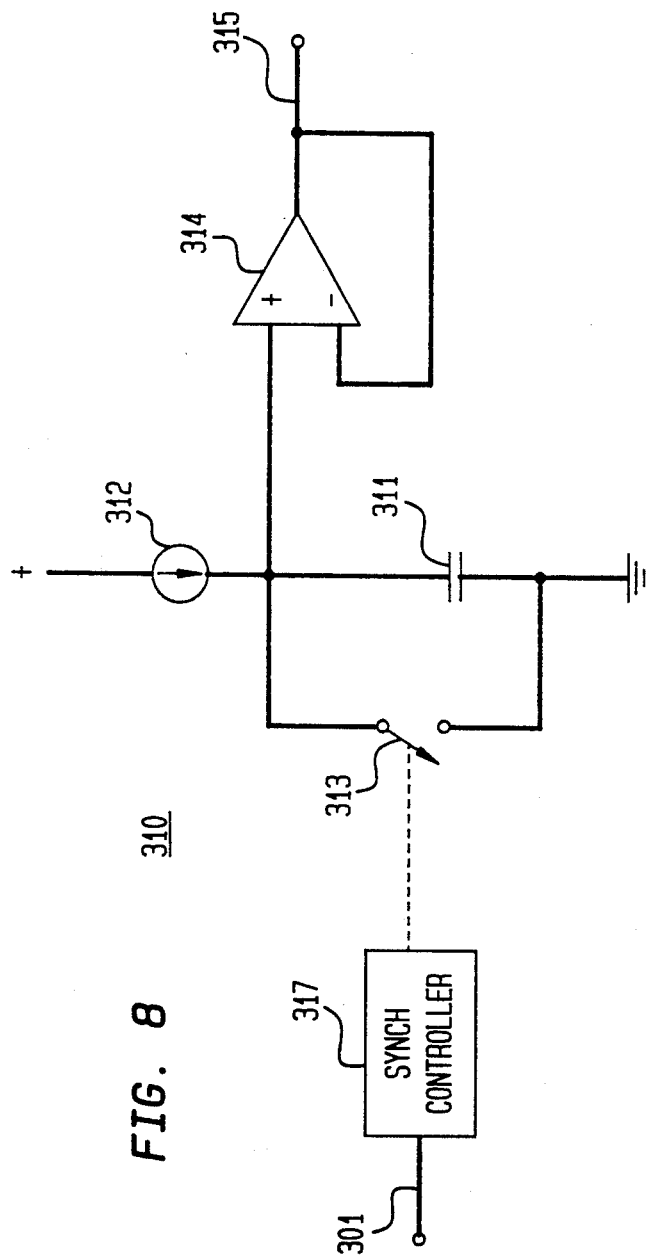
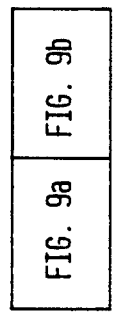

ANTI-ROLL TELEVISION VERTICAL DEFLECTION SYSTEM

CROSS REFERENCE TO RELATED APPLICATION

This application is a continuation of my co-pending U.S. patent application Ser. No. 07/550,151 now abandoned entitled "Anti-Roll Television Vertical Deflection System" filed on Jul. 9, 1990 and assigned to the present assignee hereof.

FIELD OF THE INVENTION

This invention relates generally to a television system and, more particularly, to circuitry for substantially eliminating rolling and bouncing in a video monitor, when, for example, the video monitor successively displays images from each of one of a plurality of non-synchronized video cameras.

BACKGROUND OF THE INVENTION

A conventional television system transmits a video signal containing a series of vertical synchronization (synch) pulses which occur approximately every 1/60th of a second (1/50th of a second in Europe). The vertical synch pulses provide timing information for the vertical sweep or deflection signal used to scan a cathode ray tube (CRT) to reconstruct the complete video image. Standard television receivers or video monitors contain circuitry which accepts each vertical synch pulse only after a vertical sweep is nearly complete. If a synch signal occurs before a prescribed time interval near the end of each vertical sweep, the circuitry is designed to treat the signal as a noise pulse and thereby blank out the perceived deleterious signal. In addition, conventional receivers or monitors contain a free-running vertical sweep generator which attempts to continue scanning the CRT by resetting the vertical sweep if a vertical synch pulse has not occurred within a given time period.

As a result of the so-called noise blanking and the free-running capability, if a vertical synch pulse is missed, or the frequency or phase of the synch pulses changes, the vertical sweep circuit responsive to the synch pulses will come "out-of-lock" with the vertical synch pulses. A time duration lasting through many vertical synch pulse intervals is often required for the vertical sweep circuit to re-lock onto the incoming vertical synch pulses. In addition, a conventional alternating current (AC) coupled sweep amplifier that drives the CRT is upset by the non-repetitive sweep input and hence rings and bounces for many vertical fields. During this transient, a blank bar is produced across the display of the television receiver or monitor, and the location of the image being displayed on the receiver or monitor bounces and rolls across the screen.

In video surveillance situations, it is oftentimes desirable to monitor a number of remote locations, such as entrances/exits of a building or stations along a production line, from a centralized monitoring location. For these situations, separate video cameras are stationed at each respective location to produce a view of a corresponding monitored location. If the view on each camera changes slowly, it is possible to use a single monitor to display on a time-shared basis the images produced by all the cameras, i.e., switch or sequence from one camera to the next every few seconds. To reduce system complexity and thereby mitigate operational expenses, the cameras often operate asynchronously. The rolling and bouncing image described above will likely occur when multiple, asynchronously operating cameras are used to provide separate video displays sequenced to a common monitor or group of monitors. In this instance, the composite synch signal which serves as the synch input to the monitor is composed of a series of synch pulses pseudo-randomly selected from the synch signals of the various cameras. The rolling and bouncing occurs because the periodicity of the standard vertical synch pulse is obliterated by switching back-and-forth among cameras that are not synchronized.

In the prior art of vertical deflection circuitry, U.S. Pat. No. 3,899,635 (issued to Steckler et al on Aug. 22, 1975) is representative of circuitry utilized to filter out impulse noise which could otherwise appear in the vertical synch signal and cause rolling of a displayed video image. As described in this patent, the vertical synch circuitry utilizes a resettable counter and searches for an externally applied synch pulse that occurs within a predetermined interval. If the pulse is not found, then the circuitry internally generates a vertical synch pulse.

Another type of vertical synch system is disclosed in U.S. Pat. No. 4,228,461 (issued to Weissmueller on Oct. 14, 1980). This system relies on searching for a vertical synch pulse within a pre-defined, relatively wide detection window. If such a pulse is found, it is used to initiate a vertical scan. If the pulse coincides with an internal control signal generated at a standard television (TV) frame rate, then the system switches to a relatively narrow detection window. Synch pulses that are received during the narrow window are also used to initiate vertical scans. In the event the pulses cease to coincide with the control signal for a given time interval, then the system reverts back to use of the relatively wide detection window.

Other previously devised solutions to this problem have been to use a very expensive digital time base corrector such as found in network TV or to arrange for all of the cameras in the system to be synchronized.

The prior art does not teach or suggest sweep generation techniques or deflection circuitry that can handle numerous unsynchronized incoming video signals which are purposely switched one-to-another for display on a single monitor. In fact, the synch disturbances in the single monitor case are seen as noise which is either rejected or has a long recovery time to resynchronize. Hence, a particular need exists in the art for a vertical deflection system, especially suited for use with a multiplicity of un-phased cameras utilizing a single display monitor, that, once an out-of-lock condition occurs, can re-establish a vertical lock condition on the next incoming vertical synch pulse in a vertical synch pulse stream derived from the individual synch streams of the multiple cameras.

SUMMARY OF THE INVENTION

These shortcomings and limitations of the prior art are obviated, in accordance with the present invention, by interposing retriggerable vertical deflection circuitry between the incoming vertical synch signal and the cathode ray tube (CRT) display. This retriggerable circuitry, in general, replaces the conventional vertical deflection circuitry. Thus, rather than being free-running and only accepting a vertical synch pulse at predetermined times, the circuitry in accordance with the present invention can be retriggered by an arbitrary vertical synch pulse occurring at any time. Accordingly, if an interruption occurs in vertical synchronization between the monitor and the incoming video signal, the retriggerable circuitry can re-establish a "locked" condition on the next immediate vertical synch pulse rather than requiring multiple frames to occur before achieving a locked condition.

Broadly, the retriggerable circuitry produces the appropriate vertical sweep signal during each sweep interval independently of the amplitude and duration of the sweep signal that occurred in each previous sweep interval. Moreover, the basic retriggerable circuitry may be augmented with an automatic-run mode so that a grey display appears on the monitor even if the incoming video signal is lost.

BRIEF DESCRIPTION OF THE DRAWINGS

The teachings of the present invention may be readily understood by considering the following detailed description in conjunction with the accompanying drawings, in which:

FIG. 1 is a high-level block diagram of a conventional television (TV) receiver with emphasis on the propagation path of the vertical synchronization (synch) signal through the receiver;

FIG. 2 is a timing diagram of a conventional vertical synch signal, with anomalies, and the resultant vertical sweep or deflection signal for the TV receiver show in FIG. 1;

FIG. 8 is an illustrative embodiment of retriggerable sweep generator 310 shown in FIG. 7;

FIG. 9 shows the correct alignment of the drawing sheets for FIGS. 9a and 9b;

DETAILED DESCRIPTION

Conventional Arrangements

Figure 3:
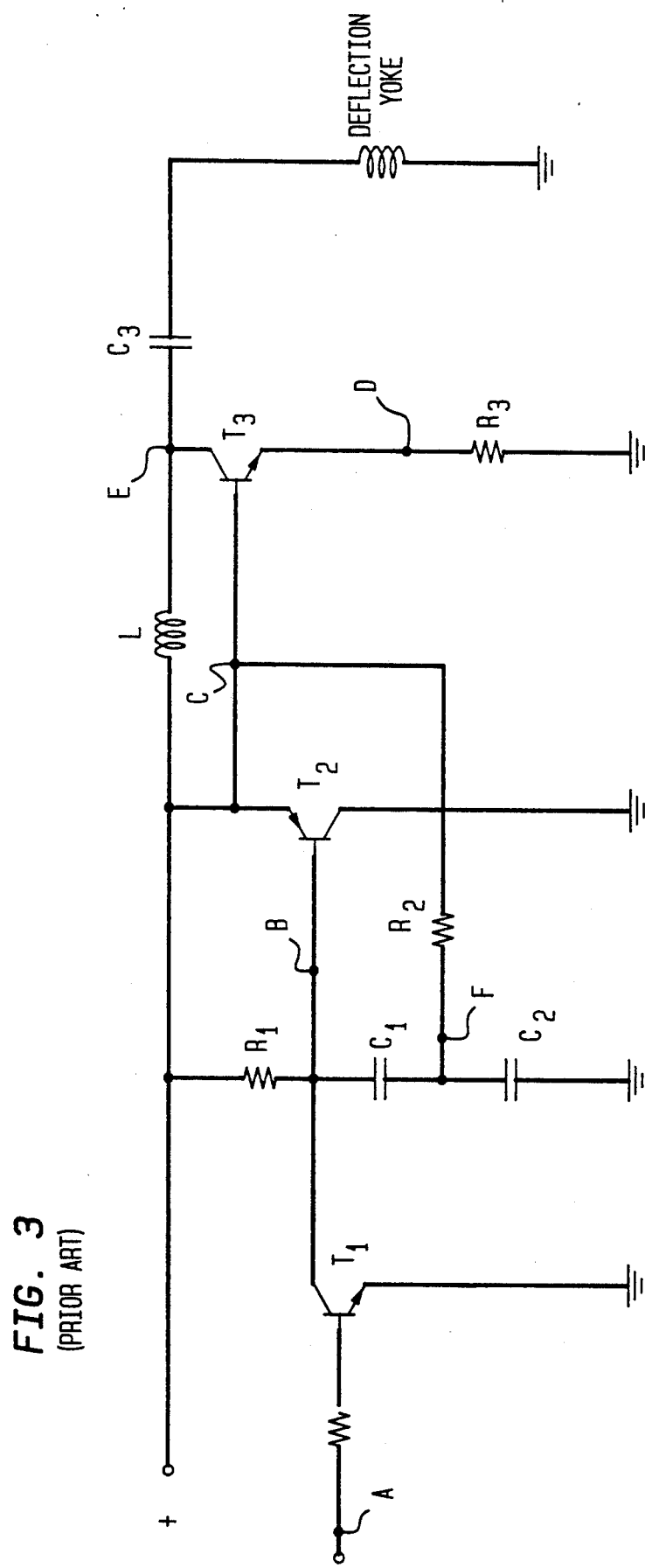
FIG. 3 is a prior art arrangement of a vertical deflection system used in computer terminals.

The initial discussion focuses on conventional television (TV) receiver 260 of FIG. 1 and on the signals for the vertical deflection system of TV receiver 260, such signals being shown in FIG. 2; the signals have been somewhat simplified to focus on the essential characteristics of the signals in accordance with the present invention. This discussion allows for the introduction of notation and terminology in preparation for elucidating the substantive aspects of the present invention.

With reference to FIG. 1, a simplified block diagram of receiver 260 is depicted with emphasis on the propagation path of the vertical deflection signal through receiver 260. The video input signal is transmitted to video input circuit 270 via input path 166. Circuit 270 serves to buffer and amplify the video input signal. Synch separator 280 strips the synch pulses from the video input signal and delivers the synch pulse stream to deflection system 295 via lead 301. The vertical sweep signal is produced by system 295 and this sweep signal is fed to cathode ray tube (CRT) display 290 on lead 351. Video and blanking signals derived from separator 280 also serve as input to display 290 via lead 281.

Now, with respect to FIG. 2, line (i) depicts conventional vertical synchronization (synch) signal 100 generally comprising a series of evenly spaced synch pulses 101, 102, 103, 104, 105, . . . of duration P seconds occurring every T seconds where P is about 190 microseconds and T is approximately 1/60 seconds (16.667 milliseconds) for the NTSC standard utilized in the United States. The corresponding vertical sweep signal 150 generated from synch signal 100 is shown on line (ii) of FIG. 2. Vertical sweep signal 150 is also periodic with a period of T seconds. During each period, such as depicted by region 151, the sweep signal is basically triangular after an initial flat portion of P seconds. Within the time encompassed by region 152, noise spike 106 is shown as appearing in vertical synch signal 100. Sweep region 152 of vertical sweep signal 150 is unaffected by this spurious noise spike because the conventional vertical sweep circuitry (not shown) used to generate sweep signal 150 in response to synch signal 100 has a noise blanking feature which will only accept synch pulses when the sweep is nearly complete. As shown on line (ii) of FIG. 2, the acceptance interval is shown as time duration D seconds within the neighborhood of the completion of the second sweep; D is typically about 5 milliseconds.

Within region 153, synch signal 100 is shown as missing a synch pulse which should have occurred as pulse 104, shown dashed on line (i). For this situation, vertical sweep 150 resets itself automatically whenever the sweep tries to continue beyond the region wherein a synch pulse should have occurred. The time interval for resetting the vertical sweep is shown as the duration R seconds on line (ii); R is often adjustable if the monitor has a vertical hold control and is typically about 3 milliseconds. The reset circuitry of the vertical sweep enters automatically into a free-run mode, thereby generating a grey display on the television screen. This grey display appears whenever the input video signal is removed; without the free-run mode the screen would go black causing the viewer/user to believe power was off to the television receiver or that the display itself was malfunctioning. Because the sweep signal in region 153 has a duration longer than the anticipated period of T seconds, any video signal occurring within the immediately succeeding region, namely, region 154, is displayed at an incorrect location on the screen. Moreover, because of the noise blanking feature of the sweep circuitry, pulse 105 of synch signal 100 is treated as noise pulse and is also ignored in the same manner as real noise pulse 106. The cumulative result of the noise blanking feature and the free-run trigger feature is that once a synch pulse is missed and the vertical sweep signal falls out-of-lock with the vertical synch signal, it oftentimes requires many synch periods to achieve lock-up or synchronism with the corresponding video signal. The long lock-up interval equates to many display fields, so that the black blanking bar rolls through the incorrectly positioned display. Eventually lock-up will occur since T and R are not harmonically related.

To create a system that can accommodate the synch phase and frequency changes that occur with changes of input video sources without the above described roll and bounce, the following changes are needed:

(1) The deflection amplifier that drives the CRT yoke or deflection plates of a display device such as a CRT must be able to accommodate very short or long sweep inputs (large variations from normal sweep period) without overload, ringing, or direct current (DC) biasing changes.

(2) The sweep sawtooth generator must be able to retrigger on each presented synch pulse and start a new sweep that has the same shape, size, and DC level as that of the normal, repetitive sweep. This means that the initial conditions of the sweep circuit must be independent of the time from the previous synch pulse, so that the sweep is the same as if the previous synch pulse was exactly one field or scan time earlier. In general, this implies that the sweep, linearity, and amplifier circuits cannot be AC coupled with short time constants of only a few scan periods.

(3) The synch stripper that detects the vertical synch (if the input is composite video) must not be upset by the changes in phase or DC level that occur in the video when changing from one source to another. If the synch comes from a separate source, it must recover quickly from any transients caused by the selection of a different source. This in general means that shorter time constants or active DC restorers in the synch detector must be implemented. With repetitive (non-transient) inputs, longer time constants of many seconds are often used. This is ineffective for monitors used in a switching system.

(4) The horizontal deflection system can usually recover from a transient in a fraction of a frame. A circuit arrangement must be devised to assure that this is the case so that a long horizontal disturbance is not propagated.

Circuits solving some, but not all, of these requirements have been utilized in specialized applications in the art as discussed below. However, there is no teaching or suggestion in the art addressing the problem of rolling or bouncing monitor images due to switching between un-phased cameras.

A vertical deflection system often deployed in computer terminals is shown in FIG. 3; this system uses a cascade of a simple transistor switch to reset a capacitor integrator, a bootstrap circuit to add linearity correction, and a simple choke-fed AC coupled deflection system. Positive vertical synch pulses are presented at node A. Transistor $T_1$ resets integrating capacitors $C_1$ and $C_2$ which are charged by resistor $R_1$. A positive sawtooth is created at node B that can be reset and retriggered from the next synch pulse. However, linearity corrector resistor $R_2$, driven by transistor $T_2$, will present an incorrect voltage at the junction of $C_1$ and $C_2$ (node F) if the synch is not periodic Deflection current driver $T_3$ amplifies the retriggered sweep on node C, but the current is not that required by the deflection yoke because of saturation of transistor $T_3$ or inductor L, and different initial condition on inductor L and capacitor $C_3$ when the sweep is retriggered. Thus, node B can be correctly retriggered, but nodes C and E have serious errors when the input synch is not continuous in frequency and phase, such as obtained when cameras are switched.

Figure 4:
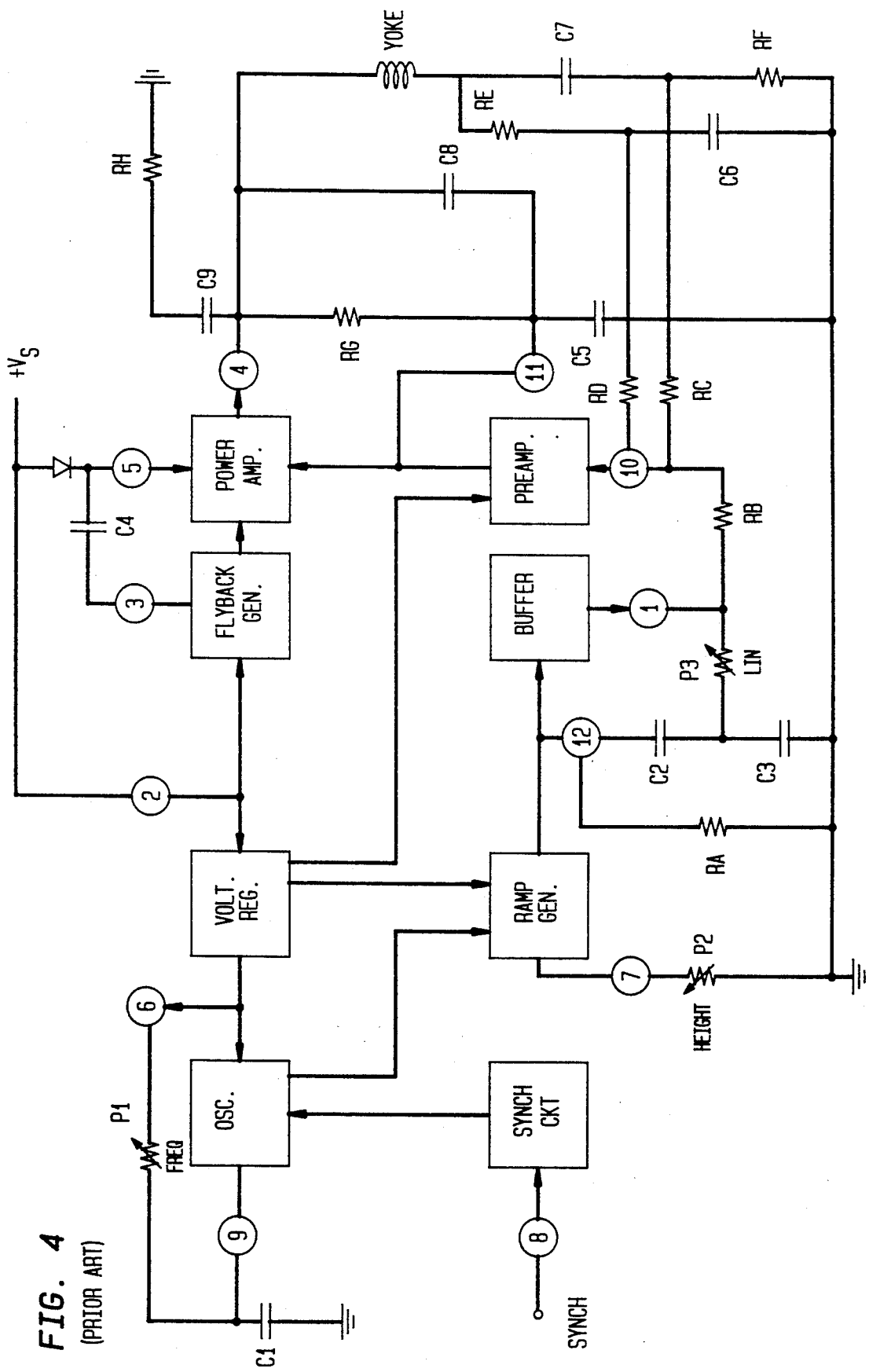
FIG. 4 shows a prior art integrated circuit chip arrangement commonly used for vertical deflection circuitry.

Another prior art device, shown in FIG. 4, is commonly used vertical deflection chip TDA1170S manufactured by KATEL Inc. The chip contains a complete deflection generator and amplifier and is relatively inexpensive which explains its wide-spread usage. The ramp generator circuit ignores input synch pulses until 70 percent of the scan is completed, i.e., once triggered, it will not retrigger for a given duration. Consequently, the chip will not work well in switched input systems. Moreover, the linearity correction of the chip is similar to the circuitry described with reference to FIG. 3 and, accordingly, it is not useful when the synch is not continuous. The deflection current amplifier is a feedback type and can offer better performance than the amplifier arrangement of FIG. 3.

In addition, the external resistor and capacitor values recommended and commonly used with the chip of FIG. 4 result in undesired image bounce and roll if the input source is derived from switched sources with synch phase changes.

Figure 5:
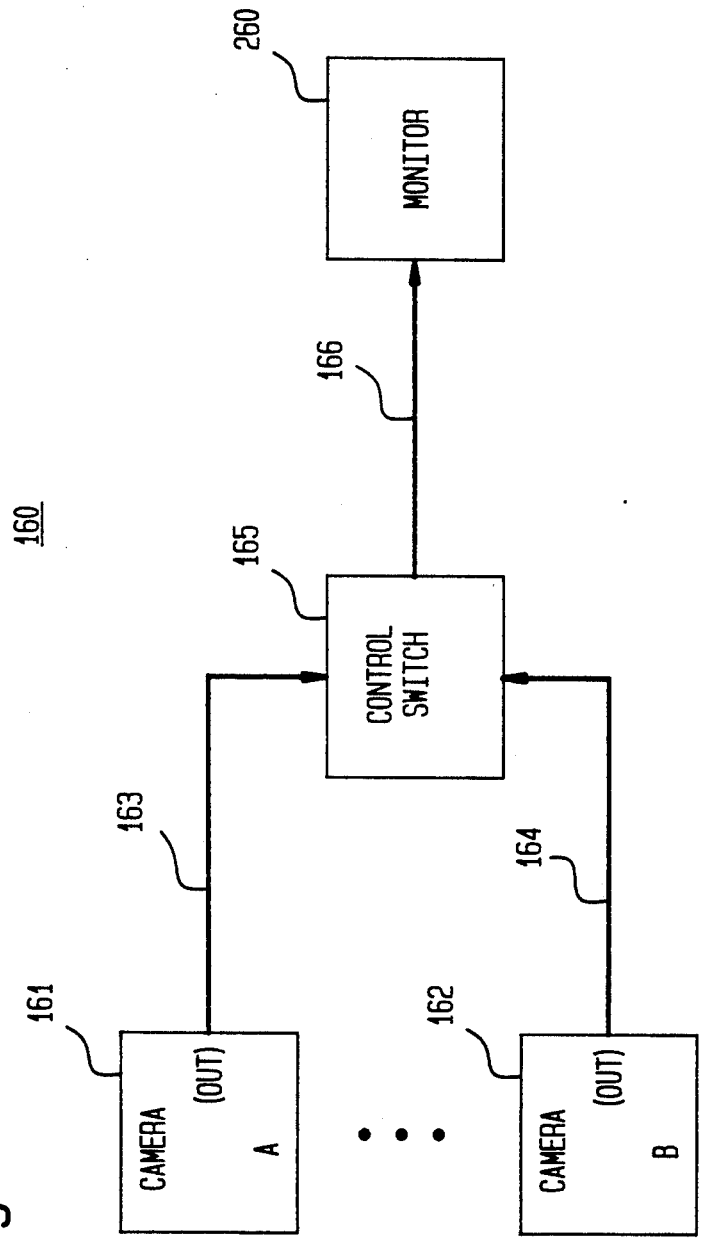
FIG. 5 is a block diagram of a multiple camera/single monitor system wherein unsynchronized video signals from the multiple cameras are sequentially delivered to the single monitor.
Figure 6:
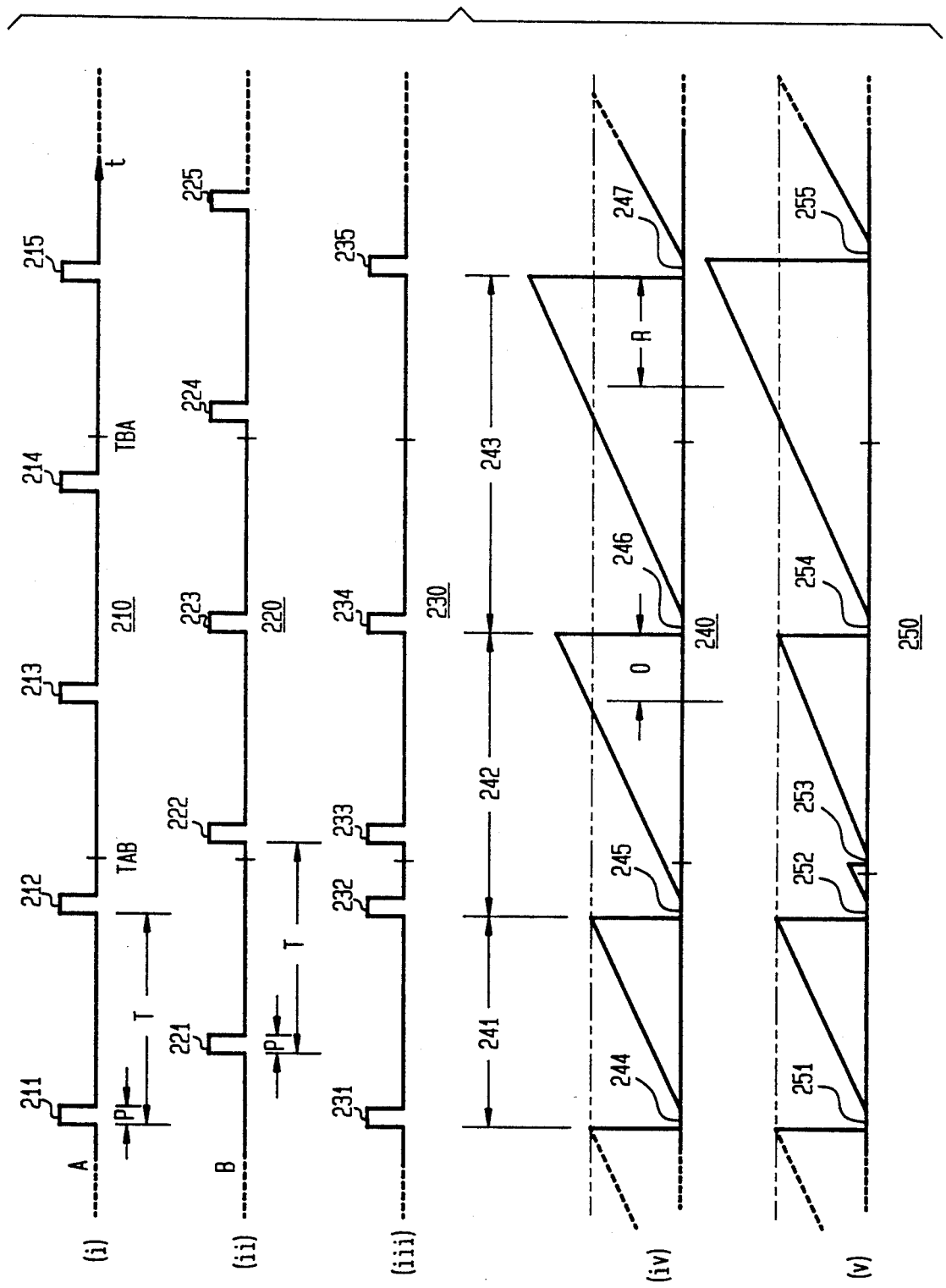
FIG. 6 is a diagram depicting the vertical synch and sweep signals for the multiple camera/single monitor system of FIG. 5.

By way of providing additional insight into the underlying principles of the present invention, reference is made to FIG. 5. The block diagram of FIG. 5 depicts system 160 wherein a multiplicity of TV cameras 161, . . . , 62 are sequentially connected to monitor 260 by the activation of control switch 165. Generally camera 161 (camera A) and camera 162 (camera B), as well as the other cameras not shown, are unsynchronized with respect to each other or out-of-phase. Accordingly, the periodic pulse stream normally presented by the vertical synch signal is disrupted by the sequential connection of unsynchronized video signals to monitor 260 by switch 165 alternately switching between channels 163 and 164. To see the effect of sequential switching on the operation of monitor 260, the vertical synch and sweep signals for multiple cameras utilizing a conventional shared monitor are considered in view of the foregoing discussion of the conventional television system. The various vertical deflection signals are discussed with reference to FIG. 6. Line (i) of FIG. 6 depicts vertical synch signal 210 as transmitted by a first TV camera, designated A. Line (ii) shows vertical synch signal 220 as transmitted by a second TV camera, designated B. In the most general case, and the case pertinent to the present invention, the cameras are not synchronized. Line (iii) details the composite or resulting synch signal 230 as presented to the vertical deflection circuitry of the single display monitor, presuming that the input video to the monitor is switched from camera A to camera B at time $T_{AB}$ and from camera B back to camera A at time $T_{BA}$. Line (iv) of FIG. 6 shows the actual vertical sweep signal 240 which is generated from the composite synch signal 230 by conventional sweep circuitry. Line (v), however, depicts the required vertical sweep signal 250 which should be produced in order to obtain the desired display on the monitor when switching between the two cameras.

Referring to line (iii), it is seen that two synch pulses 232 and 233 appear in the neighborhood to the time $T_{AB}$, with pulse 232 being provided by pulse 212 from synch signal 210 and pulse 233 being supplied by pulse 222 from synch signal 220. Because of noise blanking, pulse 233 will be suppressed as a spurious signal. In the vicinity of $T_{BA}$, no synch pulse appears in composite synch signal 230 because the monitor is switched to receive input from camera A after $T_{BA}$, that is, pulse 214 is not sensed as an input to signal 230 just prior to $T_{BA}$, and pulse 224 is ignored after switching time $T_{BA}$.

With reference to line (iv), region 241 depicts a standard sweep region. Region 242, however, depicts the combined effect of switching between cameras and the blanking of pulse 233 by the noise blanking feature of the vertical deflection circuitry. Sweep 240 overruns the standard peak value in the neighborhood of the interval designated by 0 on line (iv). As depicted, interval 0 is less than the free-run interval R, so the automatic, free-run mode is not activated. Rather, sweep 240 is reset by incoming pulse 234 of the composite synch signal and region 243 shows the resultant correct sweep in its next interval. It is noted that if interval R was smaller, or 0 larger, the free run mode would be initiated and one or more additional incorrect sweeps in region 243 and beyond could occur. Since composite synch 230 does not present a synch pulse in the neighborhood of $T_{BA}$, the free-run mode is initiated at the end of region 243 because the duration R is exceeded. This causes sweep 247, and often many of the sweeps that follow, to be incorrect. The zero-level amplitudes depicted by intervals 244, 245, and 246 are produced by synch pulses 231, 232, and 234, respectively, whereas the zero-level amplitude shown as interval 247 is caused by the free-run circuitry. Typically, then, the back-and-forth switching between cameras causes the monitor to roll and display the input video images in the wrong vertical position for many fields.

Sweep signal 250 of line (v) shows the vertical sweep signal which will lead to a display on the monitor that is roll-free and bounce-free and positions the incoming video in its correct location. The zero-level amplitudes depicted by 251, 252, . . . , 255 are produced correctly by synch signals 231, 232, . . . , 235, respectively, of composite signal 230.

Present Invention

A central purpose of the present invention is the provision of circuitry, and a concomitant methodology, for minimizing the error in the vertical sweep signal of a monitor for a multiple camera display system. A compensated vertical sweep will produce a substantially roll-free display for aperiodically appearing synch pulses characterizing the composite synch signal derived from switched cameras.

Figure 7:
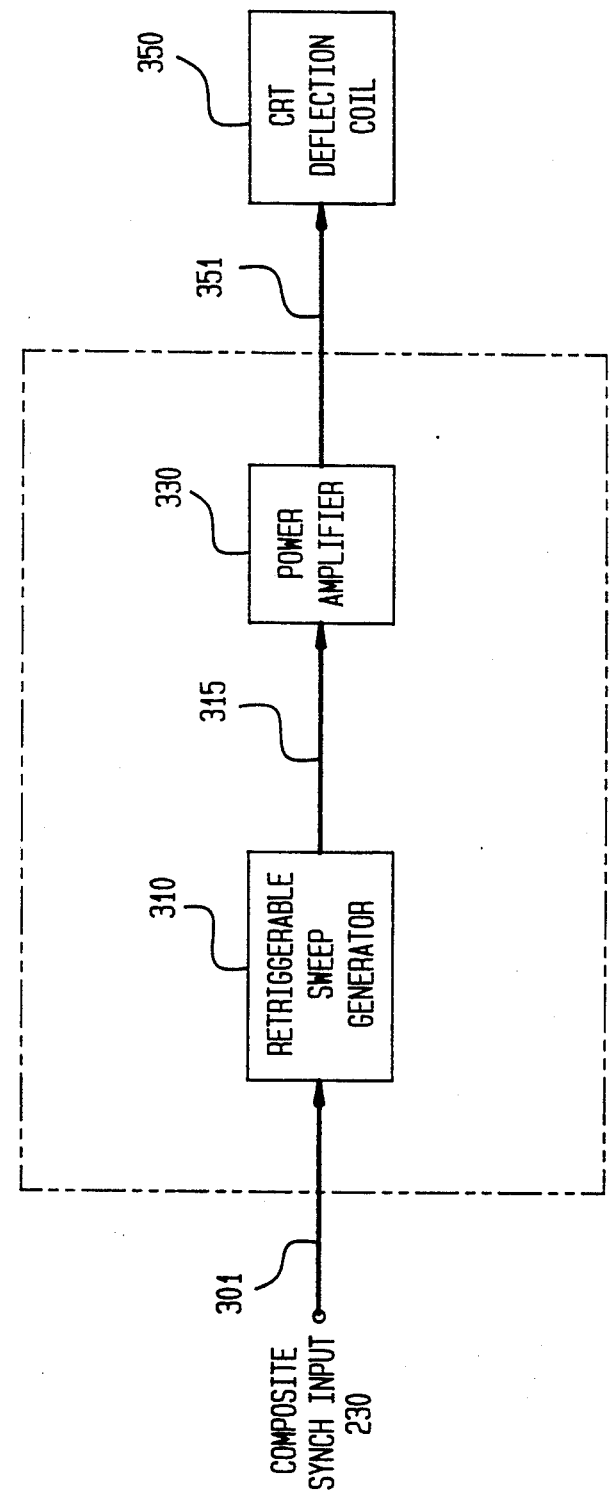
FIG. 7 is block diagram of an embodiment of vertical deflection circuitry 300 constructed in accordance with the teachings of the present invention.

The block diagram of FIG. 7 depicts circuitry 300, comprising a cascade of retriggerable sweep generator 310 and vertical power amplifier 330, interposed between composite synch signal 230, which appears on lead 301, and deflection coil 350 of a standard CRT television display. Circuitry 300 replaces the conventional noise-blanking, free-run circuitry, and AC coupled power amplifier which were elucidated in the foregoing discussion.

Retriggerable generator 310 produces a sawtooth waveform which may be reset at any time by vertical synch pulses 231, 232, . . . comprising signal 230. Thus, circuit 310 effects the required vertical sweep signal, that is, signal 250 of FIG. 6, regardless of the amplitude and duration of each previous sweep interval. The sweep signal produced by generator 310 appears on lead 315. Amplifier 330 delivers the non-periodic signal appearing on lead 315 to coil 350 without distortion or ringing and with sufficient power to drive deflection coil 350. Generator 310 may also be configured to implement an automatic-run capability so as to produce a grey display in the event the incoming video signal is disrupted.

An illustrative embodiment of generator 310, primarily in circuit element form, is shown in FIG. 8. Capacitor 311 is reset or discharged whenever switch 313 is closed, and current source 312 linearly charges capacitor 311 whenever switch 313 is open. Switch 313 operates in response to synch controller 317 which, in turn, is responsive to composite signal 230. Incoming synch pulses close switch 313 for the duration of each synch pulse. The signal appearing across capacitor 311, which is essentially the desired sweep signal 250, is transferred to lead 315 via buffer amplifier 314.

Figure 9A:
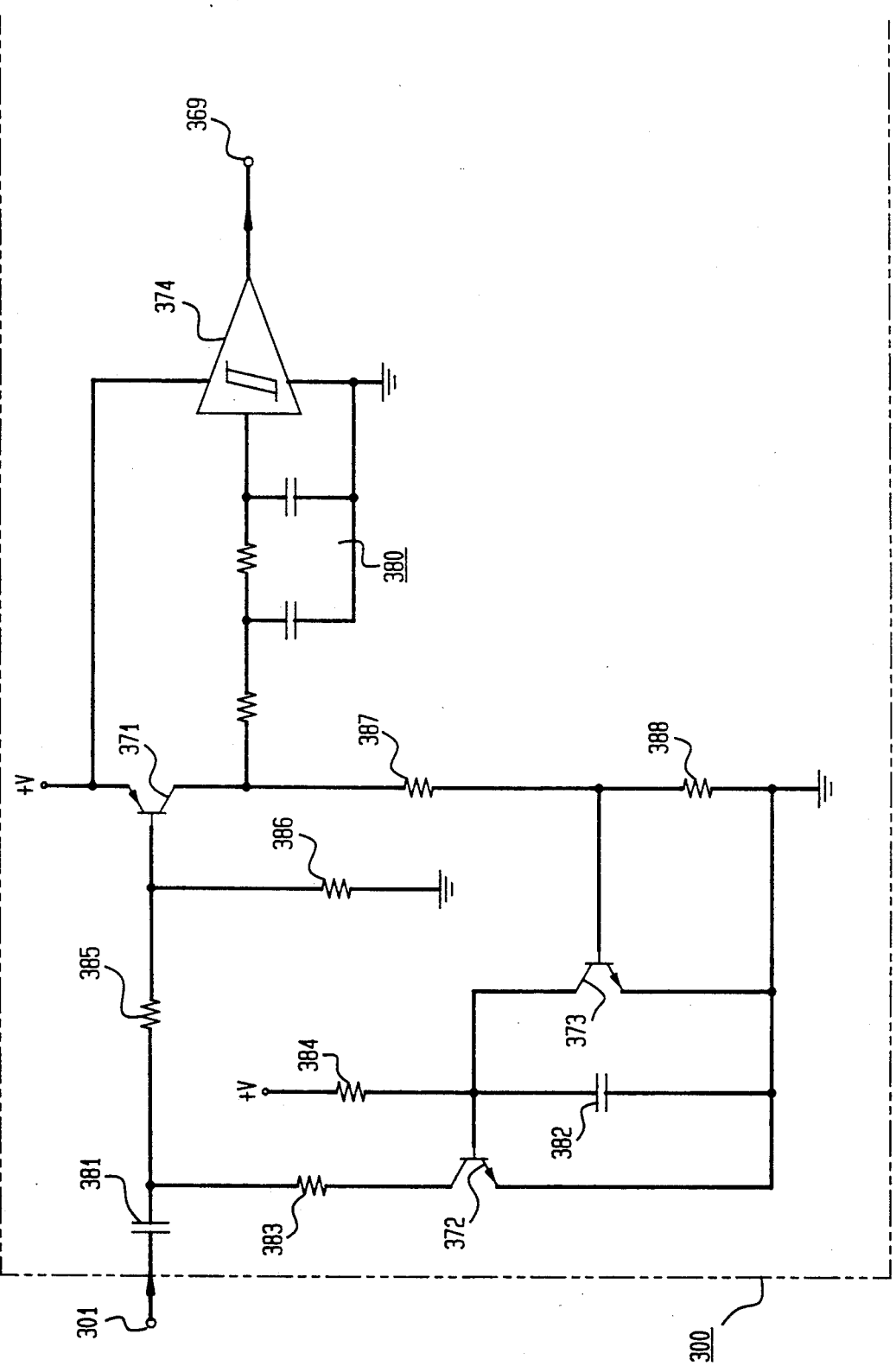
FIGS. 9a and 9b collectively depict an illustrative circuit embodiment of vertical deflection system 300 shown in block diagram form in FIG. 7.
Figure 9B:
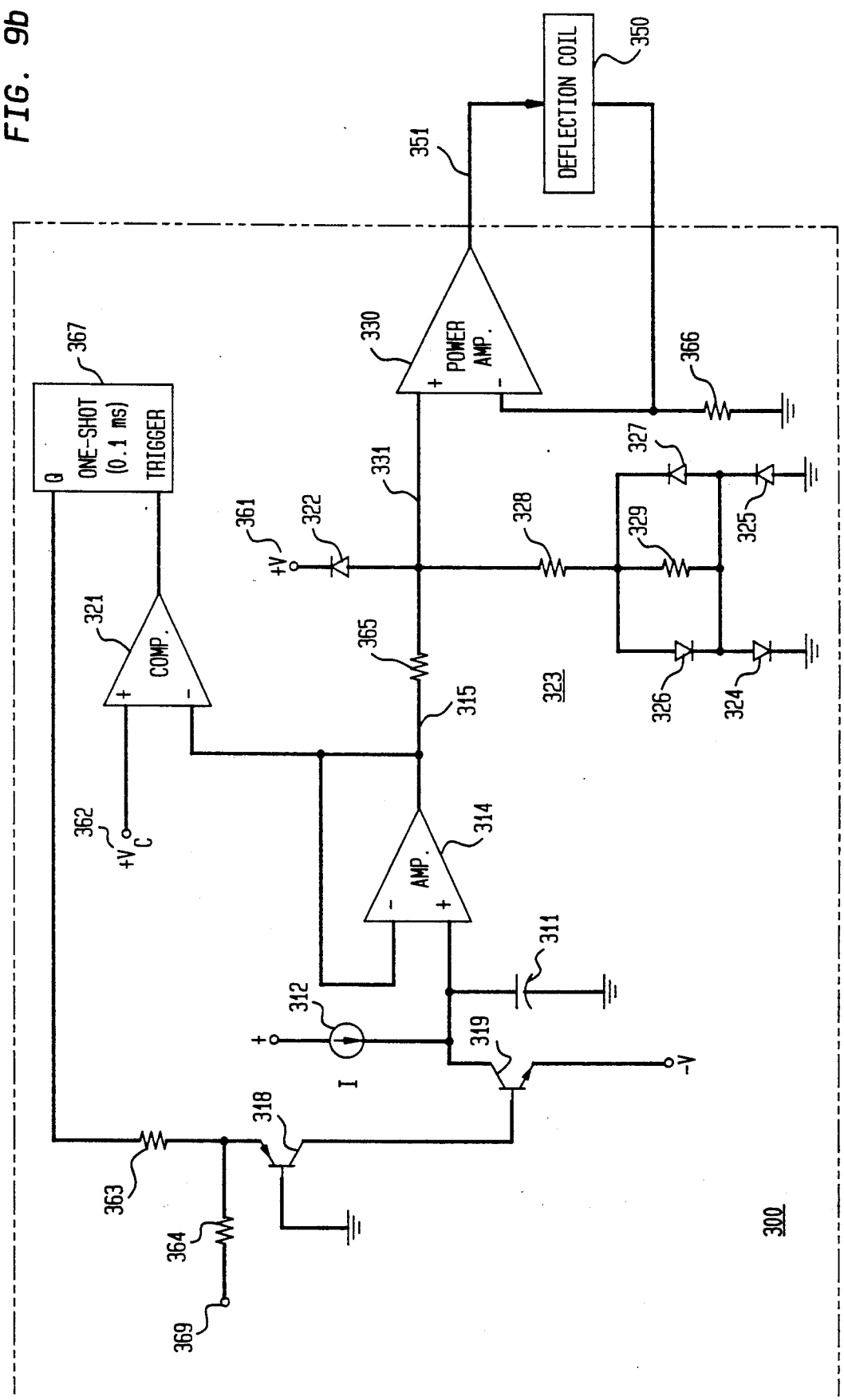

An illustrative embodiment of circuit 300, combining both generator 310 and amplifier 330, is shown in circuit component form in FIGS. 9a and 9b, for which the correct alignment of the drawing sheets for these figures is depicted in FIG. 9. . Components which are identical in FIGS. 6 and 7 have the same reference numerals.

In FIG. 9a, which composes the input portion of FIG. 9, is a combination of vertical synch generator and an input video transient corrector. The input video synch signal appears on lead 301 and serves as the input to PNP transistor 371. This transistor is driven into saturation by the negative synch levels on lead 301. The synch pulses at the collector of transistor 371 are integrated with RC filter section 380 to remove the horizontal pulses and the resulting vertical pulse is compared, squared up, and buffered by Schmidt trigger 374 having a hysteresis characteristic.

If the incoming video suffers a negative DC level shift as a result of switching to a different camera, the charge on input coupling capacitor 381 is quickly removed or corrected by the base-emitter diode of transistor 371 and resistor 385, which is small in value. However, if the video input takes a positive level shift, resistor 386, which is large in value, will take a long time to discharge capacitor 381, and transistor 371 will remain off. In this event, the circuit comprising transistors 372 and 373 senses the lack of pulses on the collector of transistor 371 for more than a prescribed interval, typically 100 microseconds. Then transistor 372 is turned on to draw charge rapidly from coupling capacitor 381 until synch pulses again appear on the collector of transistor 371. Some typical values for elements of FIGS. 9a and 9b are: capacitors 381 and 382 are 1.0 and 0.01 microfarads, respectively; RC filter section 380 is composed of 100 KΩ resistors and 0.0003 microfarad capacitors; and resistors 383–386 are, respectively, 10 KΩ, 100 KΩ, 200 Ω, 1 MΩ, 10 KΩ and 3 KΩ.

Now with reference to FIG. 9b, transistors 318 and 319 serves as both switch 313 and synch controller 317 described with reference to FIG. 8. Synch signal 230 appears on lead 369 and is one input to the emitter of transistor 318. Each synch pulse 231, 232, . . . resets or discharges capacitor 311 by turning on transistors 318 and 319 for the duration of each synch pulse. The required sweep signal appears across capacitor 311 and is transmitted to lead 315 via buffer amplifier 314. The sweep appearing on lead 315 has a maximum-to-minimum voltage swing between +V and −V (V is identified by reference numeral 361). Amplifier 314 buffers the signal generated across capacitor 311 so that diode linearity network 323 does not load capacitor 311. Diode network 323, comprising resistor 328 in cascade with the parallel combination of diodes 326 and 327 and resistor 329, and further in cascade with back-to-back diodes 324 and 325, serves to shape the signal on lead 315, that is, provides the so-called "S" shape correction practical for driving deflection coil 350. Power amplifier 330 drives deflection coil 350 in response to the output of diode network 323. Comparator 321 has its output serving as the input to one-shot multivibrator 367 and, in turn, multivibrator 367 serves as a second input to transistor 318, which resets the sweep appearing on lead 315 whenever the interval between synch pulses exceeds a prescribe limit. This is analogous to the free-run mode of the conventional deflection circuitry. Voltage level $V_C$ (reference numeral 362) is selected so that the sweep is reset if the sweep signal runs typically to more than twice the normal sweep amplitude. Diode 322 limits the sweep amplitude appearing on lead 331 to $+V$ so that a large drive signal is precluded at the input to power amplifier 331. Resistors 363-366 serve as conventional bias or load resistors and their values are determined accordingly.

Figure 10:
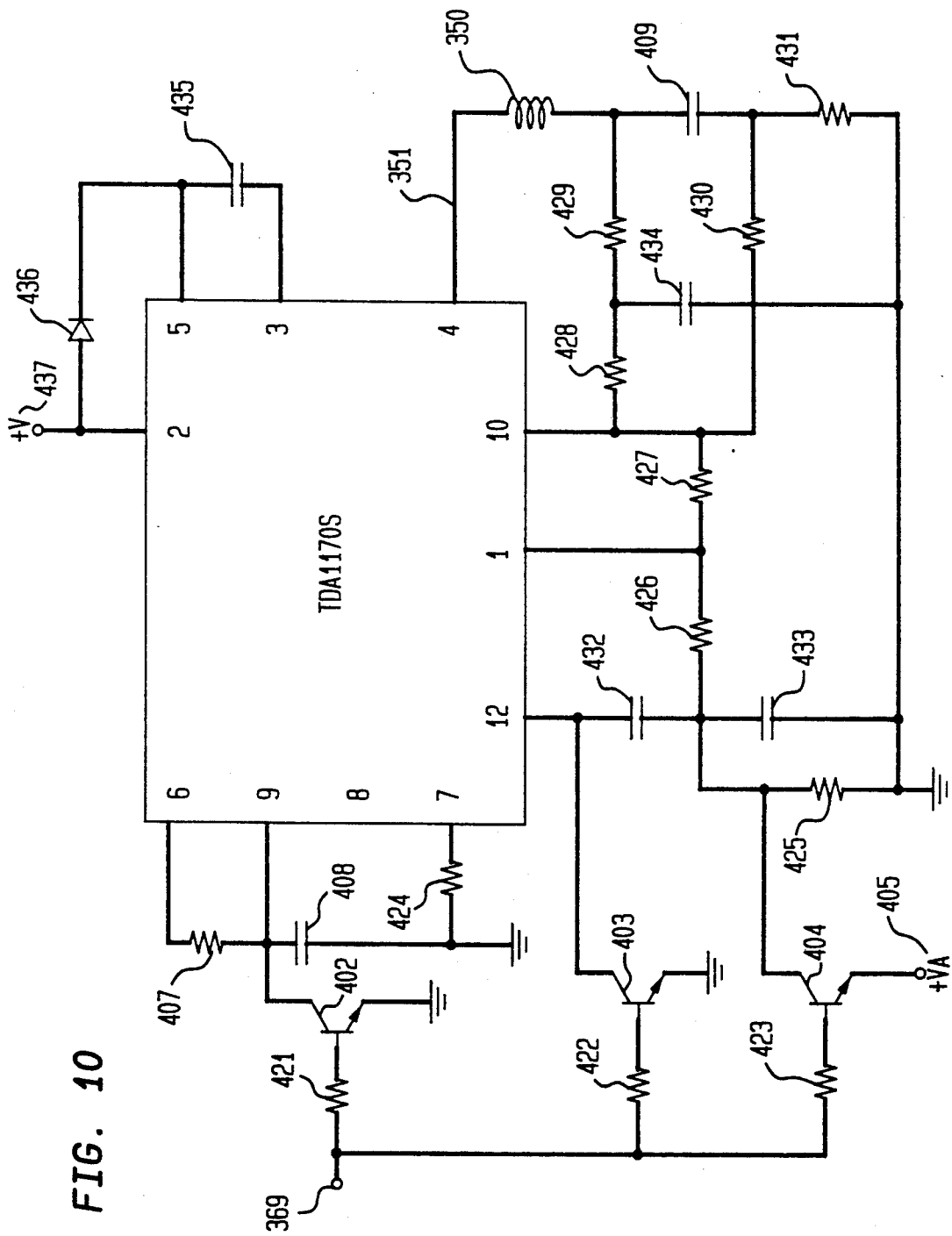
FIG. 10 is another illustrative embodiment depicting modifications to the integrated circuit chip of FIG.4 to provide the desired vertical deflection signal.

An alternative to the circuitry of FIG. 9b is shown in FIG. 10. In FIG. 10, integrated circuit chip TDA1170S, shown as device 401, was discussed earlier as prior art and is now used as a basic building-block component to implement the improved vertical deflection circuitry of the present invention. Device 401 is modified in the following manner: (1) capacitor 409 is greatly increased to a value in the range of 10,000 microfarads so that the AC-coupled circuitry driving coil 350 can respond to a transient in the synch input appearing on lead 369 without overloading, ringing, or limiting, in the same way as a DC-coupled unit would respond; (2) the circuitry is made retriggerable by directly resetting integrating capacitors 432 and 433, and resetting free-run oscillator capacitor 408 with transistors 402 and 403; (3) also, the free-running oscillator is lowered in frequency from its typical value of about 48-55 Hz. This is accomplished by setting resistor 407 to a value of about twice that value producing the typical oscillator frequency (e.g. resistor 407 is 200 KΩ instead of 100 KΩ when capacitor 408 has a value of 0.2 microfarads). This lower frequency prevents a retrigger before a true synch pulse arrives on lead 369; (4). the linearity correction portion of device 401 is reset to its correct initial condition by transistor 404. (It should be noted that voltage 405 on the emitter of transistor 404 is selected for each specific application, and in this application the voltage is typically +3 volts). In FIG. 10, typical component values not already mentioned are: resistors 424-431 are, respectively, 300 KΩ, 470 KΩ, 75 KΩ, 75 KΩ, 20 KΩ, 20 KΩ, 20 KΩ, and 1 Ω; and capacitors 432-435 are, respectively, 0.1, 0.1, 10, and 220 microfarads.

Vertical deflection circuitry 300 of the illustrative embodiment of FIG. 9b is DC coupled so it is possible to generate a proper sweep signal even for the occurrence of closely spaced synch pulses such as exemplified by the grouping of pulses 232 and 233 in signal 230. It is possible with other embodiments, such as in FIG. 10, to use AC coupling provided that the coupling capacitors are sufficiently large to accept both a short sweep situation (e.g., pulses 232 and 233 of FIG. 6) or a long sweep situation (e.g., pulse 234 followed after a long delay by pulse 235).

By way of re-iteration, key features of circuitry 300 exemplified by the embodiment of FIG. 9b include: transistor 319 can be reset at any time so as to reinitialize the sweep; linearity network 323 and power amplifier 330 are not dependent upon the previous sweep; diode 322 prevents a large overload if the input synch signal is lost; and the sweep is automatically retriggered by comparator 321 if no vertical synch pulse appears in approximately 1/30 of a second. Because of these features, the vertical sweep delivered to CRT deflection coil 350 can be triggered by an arbitrary sequence of input synch pulses, such as obtained by switching between unsynchronized cameras. Moreover, each sweep will display its corresponding video signal at the proper location on the CRT screen. In effect, if there is an interruption in the vertical synch signal or synch pulses appear pseudo-randomly because of camera switching, sweep circuitry 300 can lock-in on the very next synch pulse (rather than requiring numerous synch pulses as with conventional deflection arrangements). It should also be noted that this system has a much wider lock-in range than conventional vertical deflection circuits and can accept a wide range of vertical sweep frequencies without the need for an adjustable vertical hold control. It is also possible to replace some or all of the analog circuit blocks with digital elements that result in the same retriggerable system performance.

Figure 11:
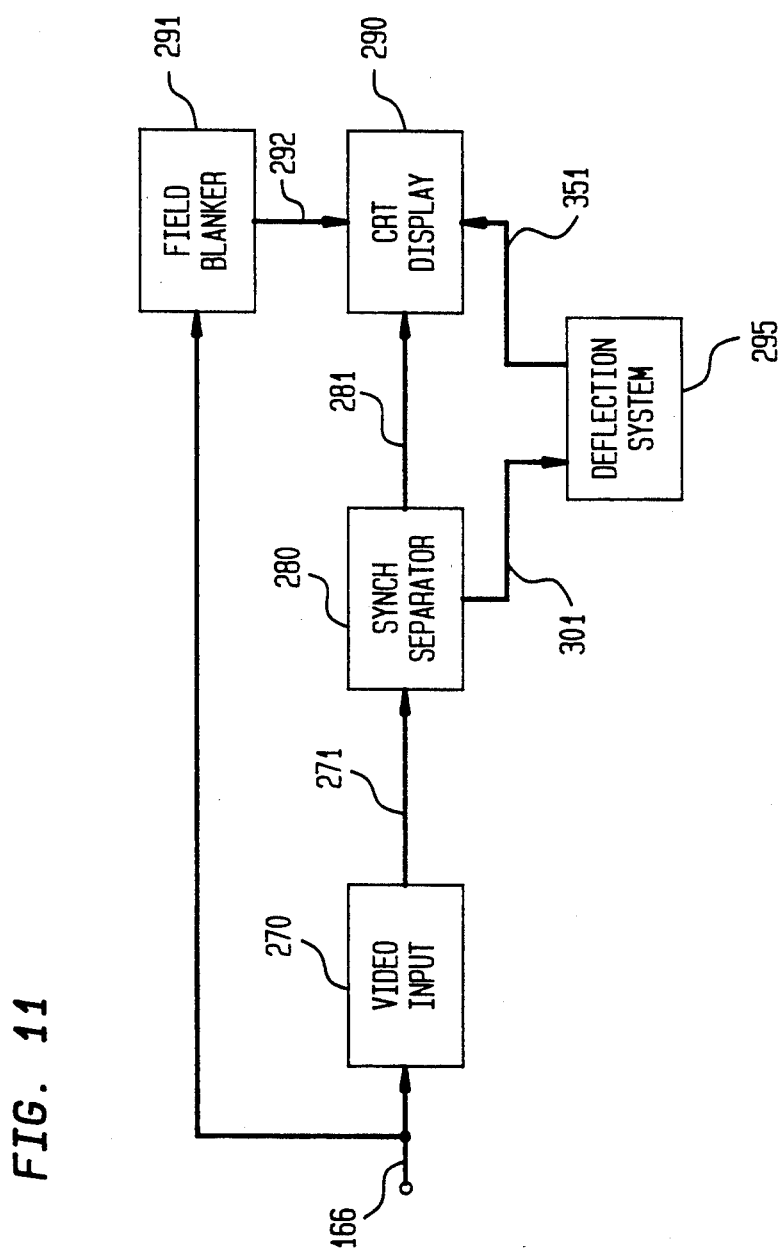
FIG. 11 is a block diagram of an arrangement for generating a one-field blanking pulse whenever control switch 165 of FIG. 5 switches the video input to monitor 260 between cameras 161 and 162.

To further improve the inventive system, switch 165 of FIG. 5 may transmit a signal, via path 166, indicating that switch 165 has changed from a prior camera display to the present camera display, say from camera 161 to camera 162. As depicted in block diagram form in FIG. 11, this transmitted signal serves as the input to field blanker 291, which is coupled to display 290, via lead 292, and which causes display 290 to blank for one field. A similar result may also be obtained by arranging synch separator 280 to detect a change in the DC level of the incoming composite video pulse stream and then blank display 290 for one field. If one field is blanked upon the initiation of each switching action, the image to be displayed on monitor 260 will be faithfully reproduced. Without this enhancement, there may be a very short time segment, corresponding to the end of the field being displayed when the input video is switched by switch 165, during which segment video information is displayed from one camera with a sweep that was triggered from a different camera. However, as alluded to above, such an unfaithful display for a very short time period is a vast improvement over the twenty or more fields that are improperly displayed without basic retriggerable circuitry 300 in accordance with the present invention.

Although various embodiments of the present invention have been shown and described in detail herein, many other varied embodiments that incorporate the teachings of my present invention may be easily constructed by those skilled in the art.

I claim:

1. Circuitry coupling an incoming composite video signal, including an incoming stream of vertical synch pulses, to a display device, said composite video signal being formed from a juxtaposition of time-limited video signals, wherein each of the time-limited video signals is derived from the video signal of one of a plurality of video sources operating asynchronously in relation to each other, the circuitry comprising:

means, coupled to the display device, for generating a vertical deflection signal in correspondence to each of the vertical synch pulses to drive the display device so as to form a steam of vertical deflection signals; and means, responsive to the vertical synch pulses and coupled to the generating means for independently retrigger at substantially any time said generating means in response to each of the vertical synch pulses so that each one of said vertical deflection signals is substantially independent of each immediately preceding one of said vertical deflection signals so as to preclude roll on the display device as each of the video sources corresponding to each juxtaposed video signal is displayed on the display device.

2. The circuitry as recited in claim 1 wherein said retriggering means includes means for extracting the vertical synch pulses from the composite video signal.

3. The circuitry as recited in claim 2 wherein said generating means includes a sawtooth generator in cascade with a power amplifier.

4. The circuitry as recited in claim 3 wherein said sawtooth generator includes a linearity correction circuit such that said correction circuit operates independently of the period of the preceding ones of said vertical deflection signals.

5. The circuitry as recited in claim 3 wherein said sawtooth generator includes means for operating said sawtooth generator in a free-run mode.

6. The circuitry as recited in claim 3 wherein said sawtooth generator includes a limiter to protect said power amplifier from overload.

7. The circuitry as recited in claim 3 wherein said sawtooth generator and said power amplifier are direct coupled so that the output of said sawtooth generator and said power amplifier is a substantially distortion-free waveform independent of the previous ones of said vertical deflection signals.

8. The circuitry as recited in claim 3 wherein said power amplifier includes an AC coupled deflection amplifier arranged with coupling capacitors and energy storage elements so as to tolerate input transients and thereby produce said vertical deflection signals at the display device.

9. The circuitry as recited in claim 2 wherein said vertical synch pulses extracting means comprises:
a pulse generator, responsive to the composite video signal, for generating a stream of output synch pulses in correspondence to the stream of vertical synch pulses in the composite video signal; and
compensation means, coupled to said pulse generator, for controlling said pulse generator to continuously produce said output synch pulses independent of any DC level shifts in the composite video signal.

10. The circuitry as recited in claim 9 further including a Schmidt-type trigger with hysteresis and wherein said pulse generator drives said Schmidt-type trigger circuit.

11. The circuitry as recited in claim 1 wherein said retriggering means comprises:
an integrating device for producing a sawtooth sweep waveform corresponding to said vertical deflection signals; and
means, coupled to said integrating device and responsive to the incoming vertical synch pulse stream, for discharging and resetting said integrating device to initiate a new sweep waveform whenever one of said vertical synch pulses is present.

12. The circuitry as recited in claim 11 wherein said sawtooth sweep generator includes diode breakpoint linearity correction means to produce an "S" shape linearity correction.

13. The circuitry as recited in claim 11 wherein said sawtooth sweep generator includes feedback linearity correction means for generating initial conditions on said sweep generator so that the sweep amplitude and shape is independent of the previous ones of said vertical deflection signals.

14. The circuitry as recited in claim 1 wherein said retriggering means comprises:
a current source;
means, responsive to said current source and coupled to the display device, for storing charge supplied by said current source and thereby generating said vertical deflection signal across said storing means; and
means, coupled to said storing means and responsive to the incoming stream, for discharging said storing means whenever each of the vertical synch pulses is present.

15. The circuitry as recited in claim 14 wherein said storing means comprises a capacitor.

16. The circuitry as recited in claim 14 wherein said discharging means comprises an on-off switch connected across said storing means, wherein said switch operates in response to the incoming stream.

17. In a system composed of (a) a plurality of video sources each generating a vertical synch pulse stream and wherein the video sources operate asynchronously relative to each other, and (b) a single video display monitor comprising a cascade of a video input circuit, a synch separator circuit and a cathode ray tube (CRT) deflection coil, circuitry comprising:
control switch means, coupled to the sources and the video input circuit, for alternately interconnecting each of the sources to the video input circuit for a pre-determined time interval to supply a composite vertical synch pulse stream as an output from the synch separator circuit, said composite vertical synch pulse stream being formed from a juxtaposition of time-limited video signals, wherein each of the time-limited video signals is derived from the video signal of a corresponding one of the plurality of video sources operating, and
means, coupled of the deflection coil and having said composite vertical synch stream as its input, for generating a vertical sweep signal in response to said composite vertical synch stream and providing said sweep signal to the coil to display the video image corresponding to the vertical synch stream, said means or generating including means, responsive to each vertical synch pulse in said composite vertical synch pulse stream, for independently retriggering at substantially any time said means for generating in response to each said vertical synch pulse so that said vertical sweep signal is substantially independent of each immediately preceding said vertical synch pulse so as to preclude roll on a displayed device as each of the video sources corresponding to each juxtaposed video signal is displayed on the display device.

18. The circuitry as recited in claim 17 further comprising field blanker means, coupled to said control switch means and the deflection coil, for blanking said video image for a preselected number of fields each time said control switch means switches to another one of the sources.

* * * * *